May 28, 1929. W. J. PLATTEN 1,715,074
INDICATOR ATTACHMENT FOR COMPUTING SCALES
Filed June 30, 1926
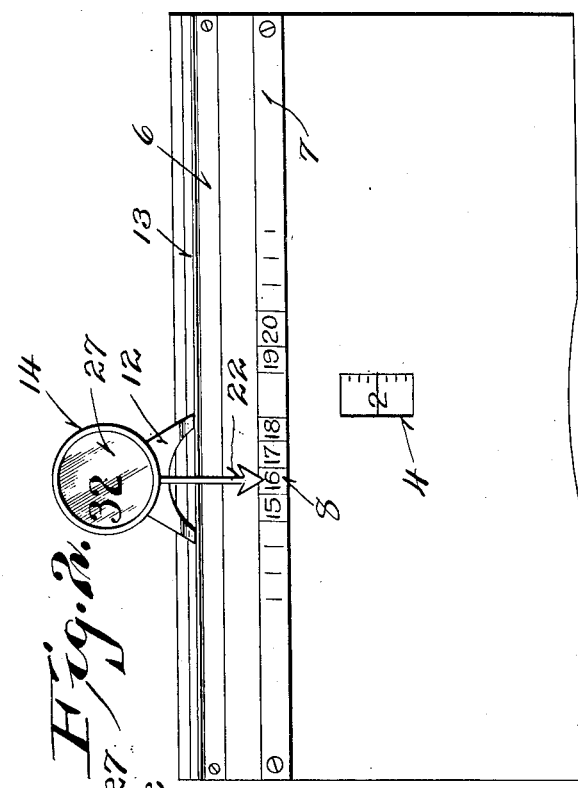
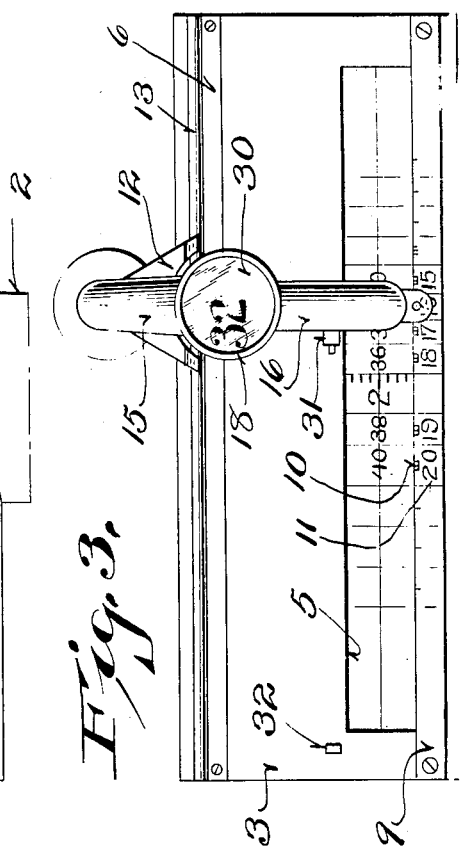
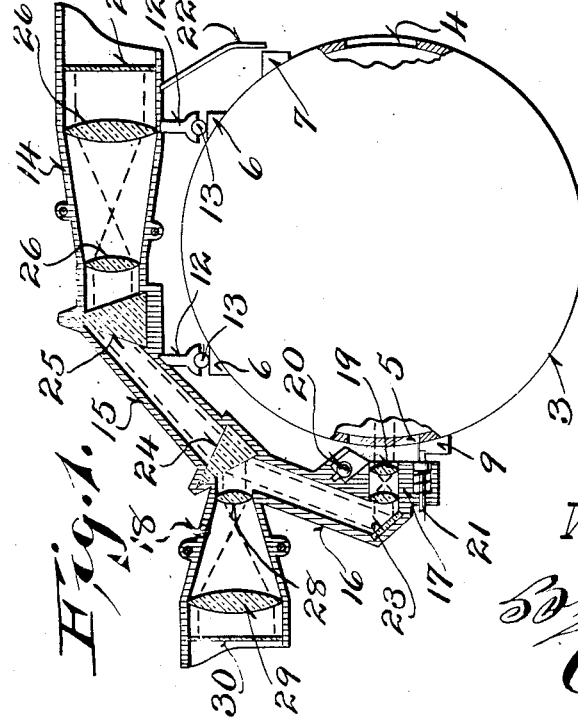
Inventor
Will J. Platten Patented May 28, 1929.

1,715,074

UNITED STATES PATENT OFFICE.

WILL J. PLATTEN, OF GREEN BAY, WISCONSIN.

INDICATOR ATTACHMENT FOR COMPUTING SCALES.

Application filed June 30, 1926. Serial No. 119,785.

This invention relates to an indicator attachment for computing scales.

In computing scales as heretofore constructed, it has been the usual practice to provide the scales so that they show the total number of pounds or fractions thereof, both at the front and rear. However, it is customary to provide these scales with computed graduations indicating the total cost of a given weight of an article when computed at any one of several rates per pound. These graduations are usually very crowded and relatively small and appear only at the rear of the computing scales.

This invention is designed to provide a novel form of indicator so constructed that by optical means, it will project the total amount indicated by the appropriate graduations to the front of the machine, so that it is projected upon a ground glass screen or otherwise made visible to the customer, and to provide means whereby this same projecting mechanism may be employed for projecting the total amount, indicated by the appropriate graduations, rearwardly, both of such projected indications being magnified so that they may be easily read without chance of error, which is ever present with the usual type of computing scales.

Further objects are to provide a simple and easily applied attachment which may be secured to ordinary computing scales without altering the construction of the scales, and which may be set at any one of a number of rates per pound with assurance that the correct graduation will appear in an enlarged and clearly visible manner upon the front screen or upon the front and rear screens.

An embodiment of the invention is shown in the accompanying drawings in which:

Figure 1 is a view showing the device applied to a computing scale, such view showing the device in section;

Figure 2 is a front view of the apparatus;

Figure 3 is a rear view thereof.

Referring to the drawings, it will be seen that the usual type of computing scale has been illustrated as provided with a weighing platform 1, a standard 2, and a cylindrical casing 3 carried by the standard, such casing being provided with front and rear openings 4 and 5 respectively, through which the graduations may be seen.

It is to be understood that the rear opening 5, as shown in Figure 3, extends from one end of the drum to the other, whereas the front opening 4 is usually relatively small, as indicated in Figure 2, although other types of openings may be employed.

The attachment comprises a pair of tracks 6 which are secured to the upper portion of the drum or casing 3, and an indicating strip 7 secured to the front of the casing and provided with graduations 8 indicating rates per pound. Further, the rear of the casing 3 is provided with a strip 9, which as may be seen from Figure 3, is provided with a plurality of notches 10 and graduations 11 indicating rates per pound.

A movable tubular frame is carried by suitable legs 12 upon the tracks 6, such legs being preferably provided with roller bearings 13, as indicated in Figure 1. This tubular member comprises a forwardly projecting flaring tube 14, downwardly and rearwardly slanting tubes 15 and 16, and an inwardly directed portion 17. If desired, a rear projecting flared tubular portion 18 may be provided for the storekeeper. The inwardly directed portion 17 carries suitable lenses 19 and a projecting lamp 20, such lamp being adapted to illuminate the rear scale or set of graduations immediately in front of the lenses 19.

The portion 17 is further provided with a spring pressed plunger 21 which is adapted to snap into any one of the notches 10 at the appropriate rate per pound, a suitable pointer 22 on the front of the apparatus registering with the corresponding graduation.

The lenses 19 project an image of the graduation directly in front of them upon a mirror 23 set at an angle in the bottom of the tube 16. From this point, the rays travel through the prisms 24 and 25 to the lenses 26 in the tubular portion 14. From this point, an image is projected upon the ground glass or other type of screen 26, or, if desired, the screen may be omitted and the customer may look directly through the tubular portion, although the screen is preferable.

Further, it is to be noted that a partial reflection occurs at the surface of the prism 24, and such reflection, by means of the lenses 28 and 29, is projected on to the rear screen 30.

It is to be distinctly understood that any suitable type of optical appliances may be employed which accomplishes the functions noted above, although the form shown is considered a highly practical embodiment of the invention.

It is to be noted that the device may be very readily applied to standard computing scales in a simple manner and without alteration of the construction of the scales.

Further, it will be seen that the device presents the image of the graduation indicating the total amount in an enlarged and well illuminated form, so that it is readily visible to the customer. Further, the device may be equipped, as described above, with a rear projecting apparatus which will project a similarly enlarged and well illuminated image of the total amount for the benefit of the storekeeper.

Obviously, the lamp 20 can be controlled in any desired manner either manually, by the movement of the optical apparatus, or by the movement of the scale platform. It will be noted from reference to Figure 3 that a plunger type switch 31 has been indicated as carried by the tube 16, such switch being normally opened by contacting with the stop 32 carried by the casing 3 when the optical apparatus is slid to the left from the scale.

The paths of the rays of light are indicated in dotted lines in Figure 1. It will be seen from this figure that the curved body portion of the tube is provided with reflecting means and with prisms. Further, it will be seen that the rays of light from the objective fall upon the reflecting means and are partially transmitted and partially reflected by the first prism. The body portion of the tubular device also, it will be noted, has three legs, the first of which carries the objective and is adapted for positioning opposite the desired legend; the second of which carries lenses and a screen and is directed rearwardly, and from the reflected rays of the prism 24 an image is formed upon the screen 30. This image, as shown in Figure 3, is upright and enlarged. The transmitted light from the prism 24 is directed forwardly towards the other optical means, that is, it may be transmitted by means of a prism 24 so that it follows the curved contour of the tube and is received by the lenses in the third of the forwardly projecting leg of the tube. An upright enlarged image is formed on the front screen 27.

It is to be distinctly understood that other forms of optical devices may be employed, providing the image is projected as described above.

It will be seen that the possibility of error due to the reading of the normally poorly illuminated and rather small graduation corresponding to the total amount, is eliminated by this invention, and the graduation appears in an enlarged and easily read condition.

Although the invention has been described in considerable detail, such description is intended as illustrative rather than limiting as the invention may be variously embodied and as the scope of such invention is to be determined as claimed.

I claim:

1. The combination of computing scales having a weighing member adapted to receive the material to be weighed, and having a casing provided with a rear window through which the legends indicating the total price of the article are visible, a pair of parallel tracks carried by said casing, a tubular member carried by said tracks and having a portion positioned opposite said rear window and adapted to be slid along said tracks to align said portions with the particular series of legends desired, a pointer carried by said tubular member, a scale with which said pointer cooperates, and optical means located within said tubular member for projecting an enlarged image of the legend opposite which the instrument is set, said optical means projecting such enlarged image both to the front and rear of the apparatus with both images standing in the same direction.

2. The combination of computing scales having a weighing member adapted to receive the material to be weighed, and having a casing provided with a rear window through which the legends indicating the total price of the article are visible, a pair of parallel tracks carried by said casing, a tubular member carried by said tracks and having a portion positioned opposite said rear window and adapted to be slid along said tracks to align said portion with the particular series of legends desired, a pointer carried by said tubular member, a scale with which said pointer cooperates, and optical means located within said tubular member for projecting an enlarged image of the legend opposite which the instrument is set, said optical means projecting such enlarged image both to the front and rear of the apparatus with the images both standing in the same direction, and releasable means for temporarily locking said tubular member at the desired position.

3. The combination of computing scales having a weighing member adapted to receive material, a movable member actuated from the weighing member and having a plurality of series of legends corresponding to various total prices, a movable optical instrument comprising a tubular body portion having an objective adapted for positioning opposite the desired legend, a front screen and a rear screen carried by said tubular member, and optical means located within said tubular member for projecting an upright image of the selected legend upon both the front screen and the rear screen.

4. The combination of computing scales having a weighing member adapted to receive material, a movable member actuated from said weighing member and having a plurality of series of legends corresponding to various total prices, a movable optical instrument comprising a curved tubular body portion having three legs, the first of said legs being adapted for positioning opposite the desired legend, the second of said legs being directed rearwardly, and the third of said legs being directly forwardly, an objective carried in the first of said legs, a reflecting member carried in the body portion for directing the rays from the objective into the body of the tubular member, a prism located in the body portion of the tubular member for receiving the rays from the reflecting member and for both directing a transmitted portion of the rays along the body portion of the tubular member towards the third leg and for directing a reflected portion of the rays into the second leg, a screen in said second leg, a screen in said third leg, and lenses in each of said second and third legs for receiving respectively, the reflected and transmitted rays from said prism and for projecting upright images upon said screens of the legend opposite the first of said legs.

In testimony that I claim the foregoing I have herunto set my hand at Green Bay, in the county of Brown and State of Wisconsin.

WILL J. PLATTEN.